US008244534B2

(12) United States Patent
Qian et al.

(10) Patent No.: US 8,244,534 B2
(45) Date of Patent: Aug. 14, 2012

(54) HMM-BASED BILINGUAL (MANDARIN-ENGLISH) TTS TECHNIQUES

(75) Inventors: Yao Qian, Beijing (CN); Frank Kao-PingK Soong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1116 days.

(21) Appl. No.: 11/841,637

(22) Filed: Aug. 20, 2007

(65) Prior Publication Data

US 2009/0055162 A1 Feb. 26, 2009

(51) Int. Cl.
*G10L 15/14* (2006.01)
*G10L 13/08* (2006.01)
*G10L 13/00* (2006.01)
*G10L 15/00* (2006.01)
*G10L 17/00* (2006.01)

(52) U.S. Cl. ..................... 704/256.3; 704/260; 704/261; 704/243; 704/250; 704/256; 704/257; 704/258

(58) Field of Classification Search .................. 704/260, 704/250, 256, 256.3, 257, 243, 261, 258
See application file for complete search history.

(56) References Cited

U.S. PATENT DOCUMENTS 4,979,216 A 12/1990 Malsheen et al.
5,680,510 A 10/1997 Hon et al.
5,682,501 A 10/1997 Sharman
5,812,975 A * 9/1998 Komori et al. ................ 704/256
5,970,453 A 10/1999 Sharman
6,085,160 A * 7/2000 D'hoore et al. ............ 704/256.2
6,163,769 A 12/2000 Acero et al.
6,317,712 B1 * 11/2001 Kao et al. ................... 704/256.3
6,418,412 B1 * 7/2002 Asghar et al. .............. 704/256.5
6,789,063 B1 * 9/2004 Yan ............................... 704/250
7,149,688 B2 12/2006 Schalkwyk
7,295,979 B2 * 11/2007 Neti et al. ..................... 704/243
2001/0056347 A1 * 12/2001 Chazan et al. ................ 704/258
2003/0065510 A1 * 4/2003 Sato ............................. 704/239
2004/0073427 A1 4/2004 Moore
2004/0193398 A1 * 9/2004 Chu et al. .......................... 704/3
2005/0159954 A1 7/2005 Chu et al.
2005/0228664 A1 10/2005 Zhao et al.

(Continued)

FOREIGN PATENT DOCUMENTS

KR 20010044202 A 6/2001

(Continued)

OTHER PUBLICATIONS

M. Huang et al., "Investigation on Mandarin Broadcast News Speech Recognition," in ICSLP, 2006.*

(Continued)

*Primary Examiner* — Douglas Godbold
*Assistant Examiner* — Edgar Guerra-Erazo
(74) *Attorney, Agent, or Firm* — Lee & Hayes, PLLC

(57) ABSTRACT

An exemplary method for generating speech based on text in one or more languages includes providing a phone set for two or more languages, training multilingual HMMs where the HMMs include state level sharing across languages, receiving text in one or more of the languages of the multilingual HMMs and generating speech, for the received text, based at least in part on the multilingual HMMs. Other exemplary techniques include mapping between a decision tree for a first language and a decision tree for a second language, and optionally vice versa, and Kullback-Leibler divergence analysis for a multilingual text-to-speech system.

14 Claims, 15 Drawing Sheets

U.S. PATENT DOCUMENTS

| | | | | |
|---|---|---|---|---|
| 2006/0053014 | A1* | 3/2006 | Yoshizawa | 704/256.4 |
| 2007/0011009 | A1 | 1/2007 | Nurminen et al. | |
| 2008/0059190 | A1* | 3/2008 | Chu et al. | 704/258 |

FOREIGN PATENT DOCUMENTS

| | | |
|---|---|---|
| KR | 20070028764 A | 6/2008 |

OTHER PUBLICATIONS

Yong Zhao; Peng Liu; Yusheng Li; Yining Chen; Min Chu; , "Measuring Target Cost in Unit Selection with Kl-Divergence Between Context-Dependent HMMS," Acoustics, Speech and Signal Processing, 2006. ICASSP 2006 Proceedings. 2006 IEEE International Conference on , vol. 1, no., pp. I-I, May 14-19, 2006.*

Le, V.B.; Besacier, L.; Schultz, T.; , "Acoustic-Phonetic Unit Similarities for Context Dependent Acoustic Model Portability," Acoustics, Speech and Signal Processing, 2006. ICASSP 2006 Proceedings. 2006 IEEE International Conference on , vol. 1, no., pp. I-I, May 14-19, 2006.*

Latorre, J., Iwano, K., Furui, S., May 2006. "New approach to the polyglot speech generation by means of an HMM-based speaker adaptable synthesizer." Speech Comm. 48, 1227-1242.*

Yong Zhao; Peng Liu; Yusheng Li; Yining Chen; Min Chu; , "Measuring Target Cost in Unit Selection with Kl-Divergence Between Context-Dependent HMMS," Acoustics, Speech and Signal Processing, 2006. ICASSP 2006 Proceedings. 2006 IEEE International Conference on , vol. 1, no., pp. I, May 14-19, 2006.*

Rached, Z.; Alajaji, F.; Campbell, L.L.; , "The Kullback-Leibler divergence rate between Markov sources," Information Theory, IEEE Transactions on , vol. 50, No. 5, pp. 917-921, May 2004.*

Tokuda, K.; Masuko, T.; Miyazaki, N.; Kobayashi, T.; , "Hidden Markov models based on multi-space probability distribution for pitch pattern modeling," Acoustics, Speech, and Signal Processing, 1999. ICASSP '99. Proceedings., 1999 IEEE International Conference on , vol. 1, no., pp. 229-232 vol. 1, Mar. 15-19, 1999.*

Silva, J.; Narayanan, S.; , "Average divergence distance as a statistical discrimination measure for hidden Markov models," Audio, Speech, and Language Processing, IEEE Transactions on , vol. 14, No. 3, pp. 890-906, May 2006.*

Hui Liang; Yao Qian; Soong, F.K.; Gongshen Liu; , "A cross-language state mapping approach to bilingual (Mandarin-English) TTS," Acoustics, Speech and Signal Processing, 2008. ICASSP 2008. IEEE International Conference on , vol., no., pp. 4641-4644, Mar. 31, 2008-Apr. 4, 2008.*

Wang, Huanliang / Qian, Yao / Soong, Frank K. / Zhou, Jian-Lai /Han, Jiqing (2006): "A multi-space distribution (MSD) approach to speech recognition of tonal languages", In INTERSPEECH-2006.*

Latorre, "A Study on Speaker-Adaptable Multilingual Synthesis", at <<http://www.furui.cs.titech.ac.jp/publication/2006/javier_doctor.pdf>>, Jul. 2006, pp. 121.

Niesler, "Language-Dependent State Clustering for Multilingual Speech Recognition in Afrikaans, South African English, Xhosa and Zulu", available at least as early as Jul. 31, 2007, at <<http://academic.sun.ac.za/su_clast/multiling/pdfs/nieslerLANGUAGEdev.pdf>>, pp. 4.

Niu, et al., "Modelling and Decision Tree Based Prediction of Pitch Contour in IBM Mandarin Speech Synthesis System", available at least as early as Jul. 31, 2007, at <<http://www.research.ibm.com/tts/pubs/ISCSLP2000_pitchtree.pdf>>, pp. 4.

Zen, et al., "The HMM-based Speech Synthesis System (HTS) Version 2.0", available at least as early as Jul. 31, 2007, at <<http://www.sp.nitech.ac.jp/~zen/english/index.php?plugin=attach &refer=International%20conferences&openfile=zen-ssw6.pdf>>, pp. 6.

Chu, et al., "Microsoft Mulan—A Bilingual TTS System", IEEE International Conference on Acoustics, Speech, and Signal Processing 2003, vol. 1, Apr. 2003, pp. I-264-I-1267.

PCT Search Report & Written Opinion for Application No. PCT/US2008/073563, mailed on Feb 10, 2009, 11 pgs.

Translated Chinese Office Action mailed Oct. 18, 2011 for Chinese patent application No. 200880103469.0, a counterpart foreign application of U.S. Appl. No. 11/841,637, 7 pages.

Ivanecky et al., "Multi-lingual and Multi-modal Speech Processing and Applications," Springer-Verlag Berlin Heidelberg, DAGM 2005, LNCS 3663, pp. 149-159.

Translated Chinese Office Action mailed May 19, 2011 for Chinese patent application No. 200880103469.0, a counterpart foreign application of U.S. Appl. No. 11/841,637, 20 pages.

* cited by examiner

EXEMPLARY METHOD 400

PROVIDE MODELS FOR PHONES OF FIRST LANGUAGE AND MODELS FOR PHONES OF SECOND LANGUAGE 404

| | English (EP) 410 | Mandarin (MP) 420 |
|---|---|---|
| Unvoiced plosive | /kʰ/ /pʰ/ /tʰ/ | /kʰ/ /pʰ/ /tʰ/ /k/ /p/ /t/ |
| Voiced plosive | /b/ /d/ /g/ | |
| Unvoiced fricative | /f/ /s/ /h/ /ʃ/ /θ/ | /f/ /s/ /ʂ/ /x/ /ɕ/ |
| Voiced fricative | /ʒ/ /ð/ /v/ /z/ | /ʐ/ |
| Unvoiced affricative | /ʧ/ | /ʦʰ/ /tʂʰ/ /ʨʰ/ /ʦ/ /tʂ/ /ʨ/ |
| Voiced affricative | /ʤ/ | |
| Nasal | /m/ /n/ /ŋ/ | /m/ /n/[1] /ŋ˥/ /ŋ˩/ /ŋ˧/<br>/n˥/ /n˩/ /n˧/ [2] |
| Lateral approximant | /l/ | /l/ |
| Approximant | /w/ /j/ /ɹ/ | |
| Front rounded | | /y/[3] /y˥/ /y˩/ /y˧/ [4] |
| Front unrounded | /ɛ/ /a/ /ɪ/ /æ/ /i:/ | /a˥/ /a˩/ /a˧/ /ɛ˥/ /ɛ˩/ /ɛ˧/<br>/i/[3] /i˥/ /i˩/ /i˧/ [4]<br>/ʅ˥/ /ʅ˩/ /ʅ˧/ /ɿ˥/ /ɿ˩/ /ɿ˧/ |
| Central unrounded | /ə/ /ə:/ | /ɚ˥/ /ɚ˩/ /ɚ˧/ |
| Back rounded | /ʊ/ /u://ɔ:/ | /o˥/ /o˩/ /o˧/ /u/[3] /u˥/ /u˩/ /u˧/ [4] |
| Back unrounded | /ʌ/ | /ɑ˥/ /ɑ˩/ /ɑ˧/ /ɤ˥/ /ɤ˩/ /ɤ˧/ |
| Diphthong | /aʊ/ /aɪ/ /oʊ/ /ɔɪ/ /eɪ/ | |

BASED ON MODELS, DETERMINE SHARED PHONES FOR THE MULTIPLE LANGUAGES 408

| SP 430 | English Vowel | Nearest Mandarin Neighbor | KLD TECHNIQUE 440 | KLD |
|---|---|---|---|---|
| | /ɔ:/ | /o˥/ | | 13.84 |
| | /ə/ | /ɤ˥/ | | 8.61 |
| | /eɪ/ | /ɛ˥/ | | 17.78 |
| | /ɪ/ | /ɛ˥/ | | 10.07 |
| | /oʊ/ | /o˥/ | | 10.87 |
| | /ɔɪ/ | /o˥/ | | 43.92 |

FIG. 4

EXEMPLARY METHOD FOR SHARED SUB-PHONES 600

EXEMPLARY TECHNIQUE FOR SPEECH SYNTHESIS
1000

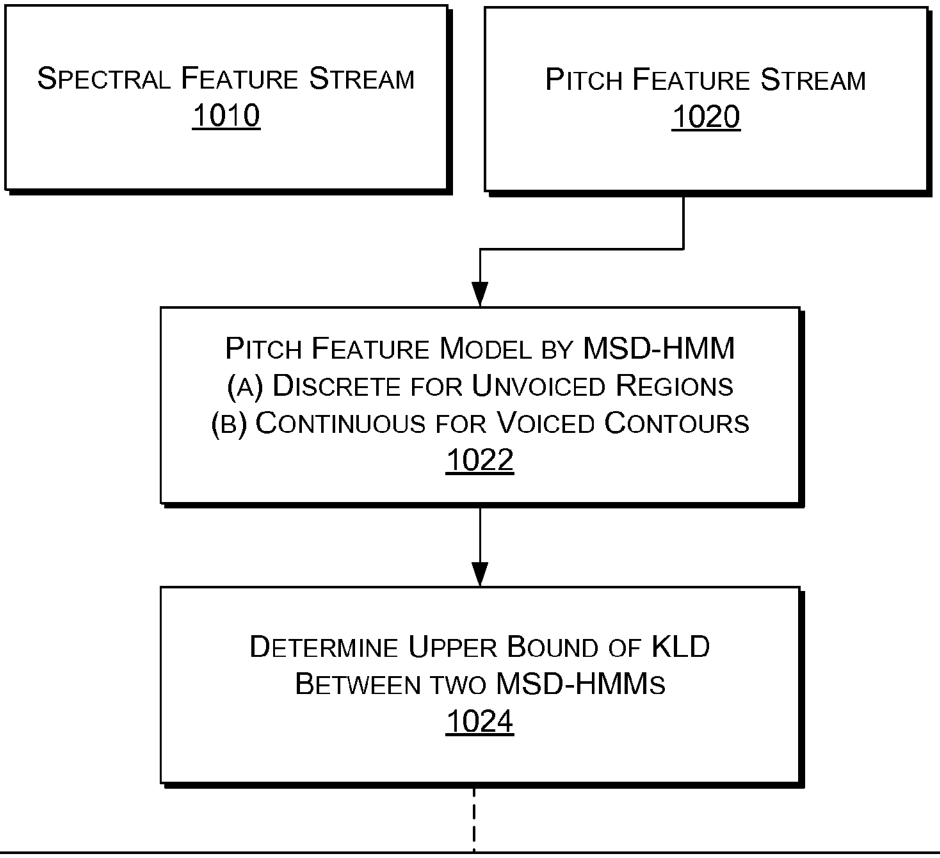

$$D_{KL}(P,Q) \le (w_0^p - w_0^q)\log\frac{w_0^p}{w_0^q} + (w_1^p - w_1^q)\log\frac{w_1^p}{w_1^q}$$
$$+\frac{1}{2}tr\{(w_1^p\boldsymbol{\Sigma}_p^{-1} + w_1^q\boldsymbol{\Sigma}_q^{-1})(\boldsymbol{\mu}_p - \boldsymbol{\mu}_q)(\boldsymbol{\mu}_p - \boldsymbol{\mu}_q)^T$$
$$+ w_1^p(\boldsymbol{\Sigma}_p\boldsymbol{\Sigma}_q^{-1} - \mathbf{I}) + w_1^q(\boldsymbol{\Sigma}_q\boldsymbol{\Sigma}_p^{-1} - \mathbf{I})\}$$
$$+\frac{1}{2}(w_1^q - w_1^p)\log\left|\boldsymbol{\Sigma}_p\boldsymbol{\Sigma}_q^{-1}\right|$$

$w_0$ and $w_1$ prior probabilities of unvoiced and voiced subspaces

FIG. 10

COMPARISON 1405
| | | SYSTEM I | | SYSTEM II |
|---|---|---|---|---|
| | | MANDARIN | ENGLISH | |
| THE NUM OF STATES | LSP | 1728 | 1791 | 2064 |
| | LOG F0 | 2971 | 4337 | 3518 |
| | DURATION | 2389 | 2402 | 1607 |
| AVERAGE LOG PROB PER FRAME | | 5.699E+02 | 5.659E+02 | 5.661E+02 |
OBJECTIVE COMPARISON 1410
| | SYSTEM 1100 | | SYSTEM 1200 | |
|---|---|---|---|---|
| | MANDARIN | ENGLISH | MANDARIN | ENGLISH |
| LOG SPECTRUM DISTANCE (dB) | 3.964 | 4.485 | 4.022 | 4.524 |
| RMSE OF F0 (HZ) | 17.17 | 23.31 | 17.69 | 22.81 |
| RMSE OF DURATION (S) | 0.0366 | 0.0578 | 0.0370 | 0.0571 |
SUBJECTIVE COMPARISON 1420
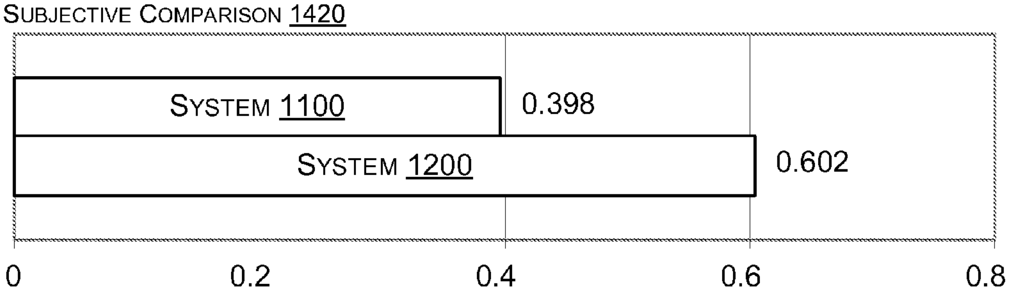
OBJECTIVE COMPARISON 1430
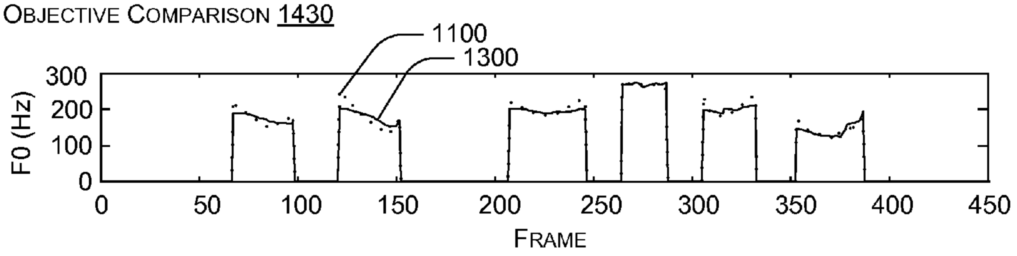
ANALYSIS OF TRAINING DATA 1440
| | MANDARIN | ENGLISH |
|---|---|---|
| MEAN (HZ) | 198.5 | 198.3 |
| VARIANCE | 2462.1 | 1398.1 |
FIG. 12

EXEMPLARY TECHNIQUE
EXTENDING SPEECH OF AN ORDINARY SPEAKER TO A "FOREIGN" LANGUAGE
1370

HMM-BASED BILINGUAL (MANDARIN-ENGLISH) TTS TECHNIQUES

BACKGROUND

While the quality of text-to-speech (TTS) synthesis has been greatly improved in the recent years, various telecommunication applications (e.g. information inquiry, reservation and ordering, and email reading) demand higher synthesis quality than current TTS systems can provide. In particular, with globalization and its accompanying mixing of languages, such applications can benefit from a multilingual TTS system in which one engine can synthesize multiple languages or even mixed-languages. Most conventional TTS systems can only deal with a single language where sentences of voice databases are pronounced by a single native speaker. Although multilingual text can be correctly read by switching voices or engines at each language change, it is not practically feasible for code-switched text in which the language changes occur within a sentence as words or phrases. Furthermore, with the widespread use of mobile phones or embedded devices, the footprint of a speech synthesizer becomes a factor for applications based on such devices.

Studies of multilingual TTS systems indicate that phonetic coverage can be achieved by collecting multilingual speech data, but language-specific information (e.g. specialized text analysis) is also required. A global phone set, which uses the smallest phone inventory to cover all phones of the languages affected, has been tried in multilingual or language-independent speech recognition and synthesis. Such an approach adopts phone sharing with the phonetic similarity measured by data-driven clustering methods or phonetic-articulatory features defined by the International Phonetic Alphabet (IPA). Intense interest exists as to small footprint aspects of TTS systems, noting that Hidden Markov Model-based speech synthesis tends to be more promising. Some Hidden Markov Model (HMM) synthesizers can have a relatively small footprint (e.g., $\leqq$2 MB), which lends itself to embedded systems. In particular, such HMM synthesizers have been successfully applied to speech synthesis of many monolinguals, e.g. English, Japanese and Mandarin. Such an HMM approach has been applied for multilingual purposes where an average voice is first trained by using mixed speech from several speakers in different languages and then the average voice is adapted to a specific speaker. Consequently, the specific speaker is able to speak all the languages contained in the training data.

Through globalization, English words or phrases embedded in Mandarin utterances are becoming more popularly used among students and educated people in China. However, Mandarin and English belong to different language families; these languages are highly unrelated in that seldom phones can be shared together based on examination of their IPA symbols.

A bilingual (Mandarin-English) TTS is conventionally built based on pre-recorded Mandarin and English sentences uttered by a bilingual speaker where a unit selection module of the system is shared across the two languages, while phones from the two different languages are not shared with each other. Such an approach has certain shortcomings. The footprint of such a system is large, i.e., about twice the size of a single language system. In practice, it is also not easy to find a sufficient number professional bilingual speakers to build multiple bilingual voice fonts for various applications.

Various exemplary techniques discussed herein pertain to multilingual TTS systems. Such techniques can reduce a TTS system's footprint compared to existing techniques that require a separate TTS system for each language.

SUMMARY

An exemplary method for generating speech based on text in one or more languages includes providing a phone set for two or more languages, training multilingual HMMs where the HMMs include state level sharing across languages, receiving text in one or more of the languages of the multilingual HMMs and generating speech, for the received text, based at least in part on the multilingual HMMs. Other exemplary techniques include mapping between a decision tree for a first language and a decision tree for a second language, and optionally vice versa, and Kullback-Leibler divergence analysis for a multilingual text-to-speech system.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 4 is a diagram of an exemplary method determining shared phones for English and Mandarin.

FIG. 10 is a diagram of an exemplary technique for speech synthesis.

FIG. 12 is a series of tables and plots for comparing the exemplary systems to the baseline system of FIG. 11.

DETAILED DESCRIPTION

Figure 1:
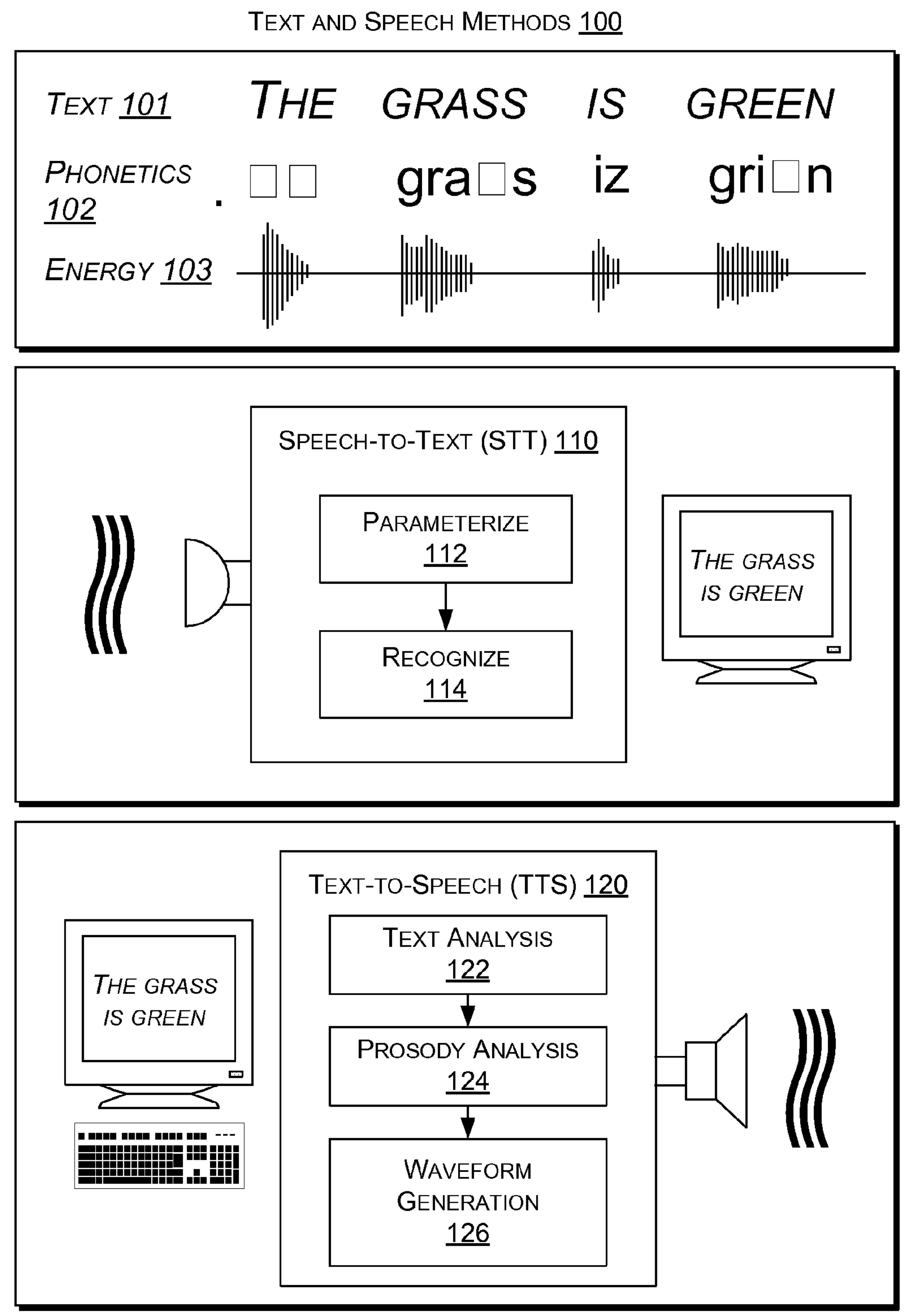
FIG. 1 (PRIOR ART)
FIG. 1 is a diagram of text and speech methods including speech to text (STT) and text to speech (TTS).

Techniques are described herein for use in multilingual TTS systems. Such techniques may be applied to any of a variety of TTS approaches that use probabilistic models. While various examples are described with respect to HMM-based approaches for English and Mandarin, exemplary techniques may apply broadly to other languages and TTS systems for more than two languages.

Several exemplary approaches for sound sharing are described herein. An approach that uses an IPA-based examination of phones is suitable for finding some phones from English and Mandarin are sharable. Another exemplary approach demonstrates that sound similarities exist at the level of sub-phonemic productions, which can be sharable as well. Additionally, complex phonemes may be rendered by two or three simple phonemes and numerous allophones, which are used in specific phonetic contexts, provide more chances for phone sharing between Mandarin and English.

Various exemplary techniques are discussed with respect to context-independence and context-dependence. A particular exemplary technique includes context-dependent HMM state sharing in bilingual (Mandarin-English) TTS system. Another particular exemplary technique includes state level mapping for new language synthesis without having to rely on speech for a particular speaker in the new language. More specifically, a speaker's speech sounds in another language mapped to sounds in the new language to generate speech in the new language. Hence, such a method can generate speech for a speaker in a new language without requiring recorded speech of the speaker in the new language. Such a technique synthetically extends the language speaking capabilities of a user.

An exemplary approach is based on a framework of HMM-based speech synthesis. In this framework, spectral envelopes, fundamental frequencies, and state durations are modeled simultaneously by corresponding HMMs. For a given text sequence, speech parameter trajectories and corresponding signals are then generated from trained HMMs in the Maximum Likelihood (ML) sense.

Various exemplary techniques can be used to build an HMM-based bilingual (Mandarin-English) TTS system. A particular exemplary technique includes use of language-specific and language-independent questions designed for clustering states across two languages in one single decision tree. Trial results demonstrate that an exemplary TTS system with context-dependent HMM state sharing across languages outperforms a simple baseline system where two separate language-dependent HMMs are used together. Another exemplary technique includes state mapping across languages based upon the Kullback-Leibler divergence (KLD) to synthesize Mandarin speech using model parameters in an English decision tree. Trial results demonstrate that synthesized Mandarin speech via such an approach is highly intelligible.

An exemplary technique can enhance learning by allowing a student to generate foreign language speech using the student's native language speech sounds. Such a technique uses a mapping, for example, established using a talented bilingual speaker. According to such a technique, the student may more readily comprehend the foreign language when it is synthesized using the student's own speech sounds, albeit from the speakers native language. Such a technique optionally includes supplementation of the foreign language, for example, as the student becomes more proficient, the student may provide speech in the foreign language.

FIG. 1 shows text and speech methods 100 including a speech-to-text (STT) method 110 and a text-to-speech (TTS) method 120. Text 101 can be represented phonetically using the IPA 102. When the text is spoken or generated, the energy 103 can be presented as amplitude versus time. The energy waveforms 103 may be analyzed using any of a variety of techniques, for example, using Fourier techniques, the energy may be transformed into a frequency domain.

The STT method 110 receives energy (e.g., analog to digital conversion to a digital waveform) or a recorded version of energy (e.g., digital waveform file), parameterizes the energy waveform 112 and recognizes text corresponding to the energy waveform 114. The TTS method 120 receives text, performs a text analysis 122, a prosody analysis 124 and then generates an energy waveform 126.

As already mentioned, exemplary techniques described herein pertain primarily to TTS methods and systems and, more specifically, to multilingual TTS methods and systems.

Figure 2:
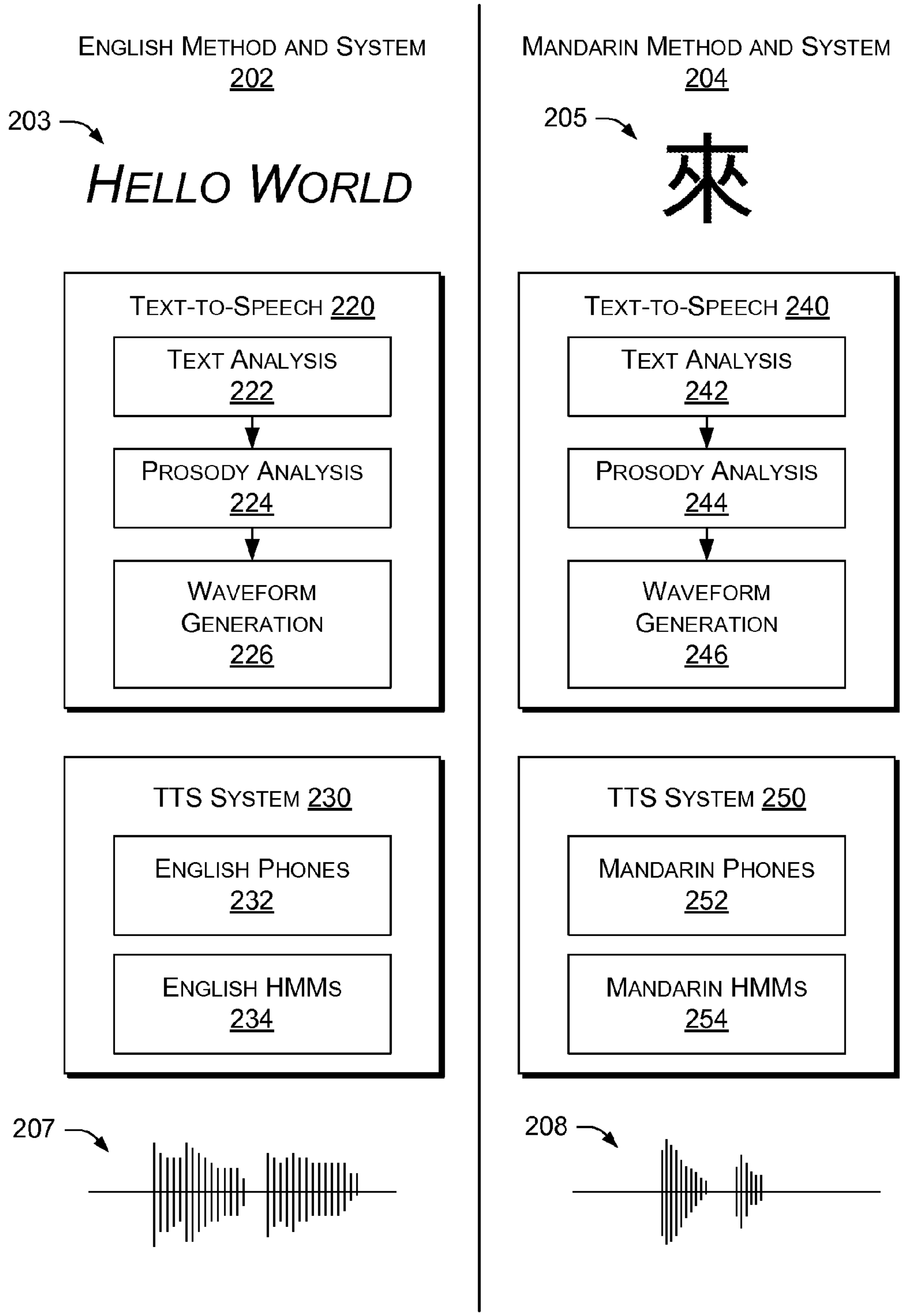
FIG. 2 (PRIOR ART)
FIG. 2 is a diagram of a TTS method and system for English and a TTS method and system for Mandarin.

FIG. 2 shows an English method and system 202 and a Mandarin method and system 204. These are two separate conventional systems and a device that required English and Mandarin capabilities for TTS would require enough memory for both the English method and system 202 and the Mandarin method and system 204.

The English method and system 202 and the Mandarin method and system 204 are described simultaneously as the various steps and components are quite similar. The English method and system 202 receive English text 203 and the Mandarin method and system 204 receive Mandarin text 205. TTS method 220 and 240 perform text analysis 222, 242, prosody analysis 224, 244 and waveform generation 226, 246 to produce waveforms 207, 208. Of course, for example, specifics of text analyses differ from English and Mandarin.

The English TTS system 230 includes English phones 232 and English HMMs 234 to generate waveform 207 while the Mandarin TTS system 250 includes Mandarin phones 252 and Mandarin HMMs 254 to generate waveform 208.

Figure 3:
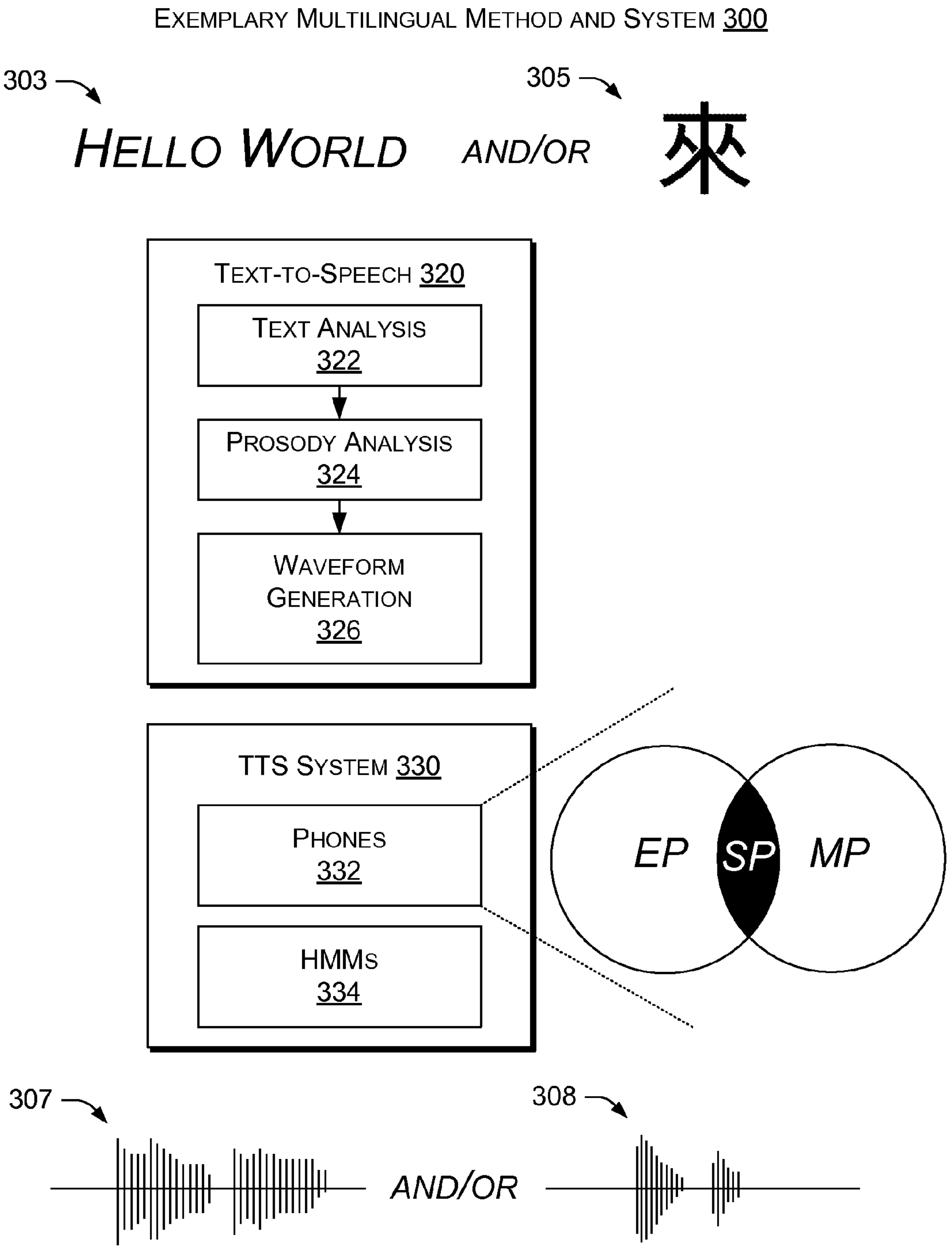
FIG. 3 is a diagram of an exemplary multilingual TTS method and system.

As described herein, an exemplary method and system allows for multilingual TTS. FIG. 3 shows an exemplary multilingual method and system 300. The exemplary TTS method 320 performs text analysis 320 for English text ("Hello World") 303 and/or Mandarin text 305 ("來") followed by prosody analysis 324 and waveform generation 326. The method 320 uses the exemplary system 330, which includes a set of phones 332 and corresponding HMMs 334 to allow for generation of waveforms 307 and 308, depending on whether English text 303 and/or Mandarin text 305 are received. As indicated in FIG. 3, the phones 332 include English phones (EP) and Mandarin phones (MP). Further, some of the phones may be shared, designated as shared phones (SP).

As for building a bilingual, Mandarin and English, TTS system such as the system 330 of FIG. 3, a preliminary step is to decide on a phone set to cover all speech sounds in the two languages. Additionally, such a phone set should be compact enough to facilitate phone sharing across languages and make a reasonable sized TTS model. Several exemplary approaches are described herein to find possible sound sharing candidates. As discussed with respect to the trial results (see, e.g., FIG. 12), criteria for sharing may be objective and/or subjective. At times, the term "practical" is used for sharing (e.g., phone, sub-phone, complex phone, etc., sharing), which means that a multilingual system can operate with an acceptable level of error.

One exemplary approach examines IPA symbols for phones of a first language and phones of a second language for purposes of phone sharing. IPA is an international standard for use in transcribing speech sounds of any spoken language. It classifies phonemes according to their phonetic-articulatory features. IPA fairly accurately represents phonemes and it is often used by classical singers to assist in singing songs in any of a variety of languages. Phonemes of different languages labeled by the same IPA symbol should be considered as the same phoneme when ignoring language-dependent aspects of speech perception.

The exemplary IPA approach and an exemplary Kullback-Leibler divergence (KLD) approach are explained with respect to FIG. 4, noting that FIG. 4 pertains primarily to the KLD approach (per block 408) yet it shows English phones (EP) 410 and Mandarin phones (MP) 420, which are relevant to the IPA approach.

FIG. 4 shows an exemplary KLD-based method 400 for analyzing phonemes of two languages for purposes of sharing between the two languages. In the example of FIG. 4, a provision block 404 provides all phonemes in English (EP 410) and Mandarin (MP 420) where the English phoneme set consists of 24 consonants, 11 simple vowels and five diphthongs, while the Mandarin phoneme set is a finer set that consists of 27 simple consonants, 30 consonants with a glide and 36 tonal vowels. The block 404 further includes superscripts 1-4, which are as follows: 1 Used as a syllable onset (Initial); 2 Used as a syllable coda; 3 Used as a glide; and 4 Used as a syllable nucleus or coda.

In the exemplary IPA approach, which examines IPA symbols, eight consonants, /k /, /p /, /t /, /f/, /s/, /m/, /n/ and /l/, and two vowels (ignoring the tone information), / / and /a/, can be shared between the two languages. Thus, the IPA approach can determine a shared phone set.

In the exemplary KLD-based approach, a determination block 408 performs a KLD-based analysis to by checking EP 410 and MP 420 for sharable phones (SP) 430. The KLD technique provides an information-theoretic measure of (dis) similarity between two probability distributions. When the temporal structure of language HMMs is aligned by dynamic programming, KLD can be further modified to measure the difference between HMMs of two evolving speech sounds.

Figure 5:
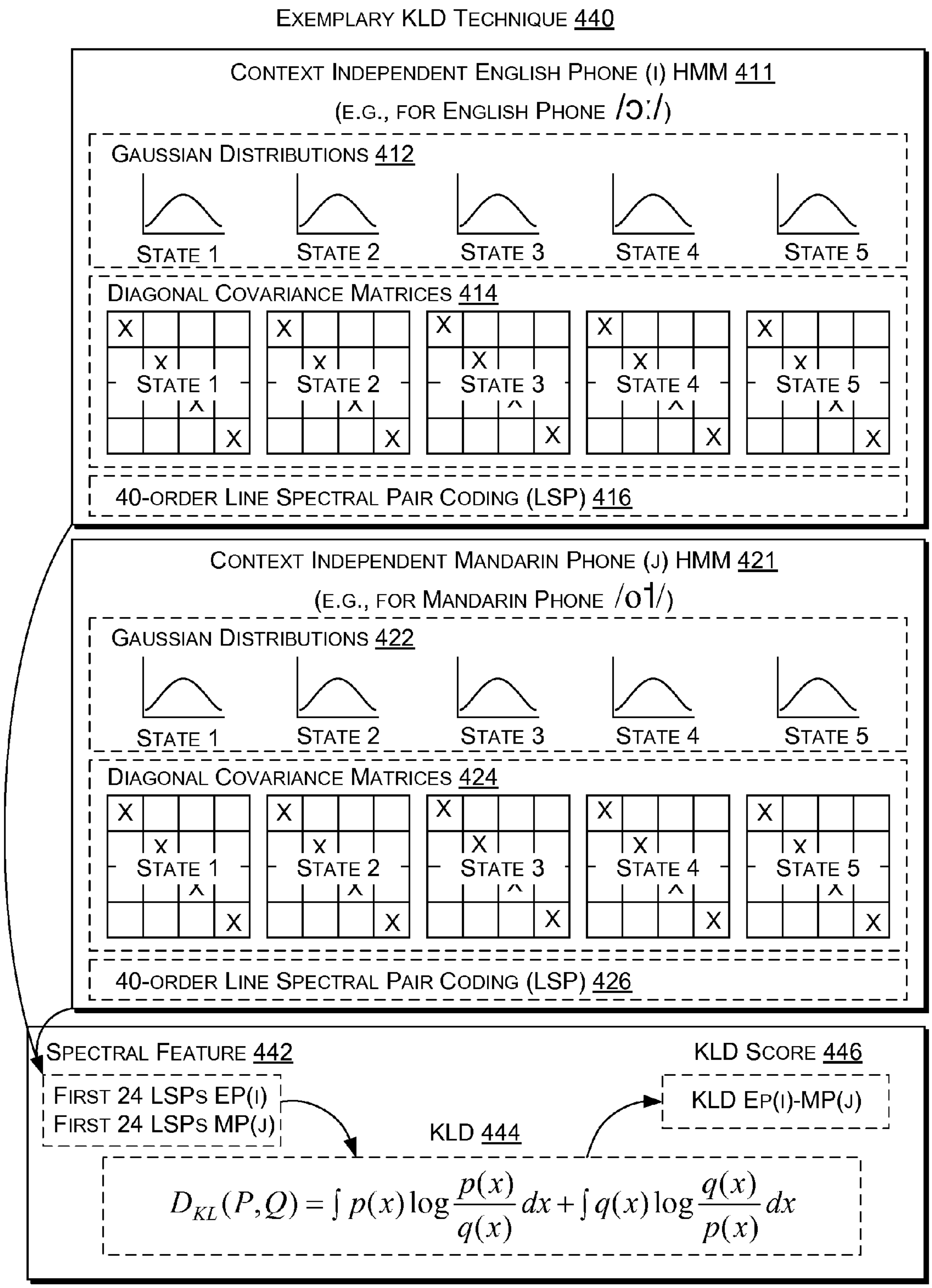
FIG. 5 is a diagram of an exemplary technique that uses KLD to determine whether sharing is practical between an English phone and a Mandarin phone.

FIG. 5 shows the exemplary KLD technique 440 as applied to an English phone HMM(i) 411 for phone "i" of an English phone set and a Mandarin phone HMM(j) 421 for phone "j" of a Mandarin phone set. According to the KLD technique, for two given distributions P and Q of continuous random variables, the symmetric form of KLD between P and Q is represented by the equation KLD 444 of FIG. 5. In this equation, p and q denote the densities of P and Q. For two multivariate Gaussian distributions, the equation 444 has a closed form:

$$D_{KL}(P, Q) = \frac{1}{2} tr\left\{\left(\sum_p^{-1} + \sum_q^{-1}\right)(\mu_p - \mu_q)(\mu_p - \mu_q)^T + \sum_p \sum_q^{-1} + \sum_q \sum_p^{-1} - 2I\right\}$$

where μ and Σ are the corresponding mean vectors and covariance matrices, respectively. According to the KLD technique 440, each EP and each MP in block 404 is acoustically represented by a context-independent HMM with 5 emitting states (States 1-5 in FIG. 5). Each state output probability density function (pdf) is a single Gaussian with a diagonal covariance matrix. For the English phone HMM(i) 411, a Gaussian distribution 412 and a diagonal covariance matrix 414 exists for each state and for the Mandarin phone HMM(j) 421, a Gaussian distribution 422 and a diagonal covariance matrix 424 exists for each state. In addition, for the example of FIG. 5, line spectral pair (LSP) coding is used 416, 426 for both the English phone and the Mandarin phone.

According to the KLD technique 440, the spectral feature 442 used for measuring the KLD between any two given HMMs is the first 24 LSPs out of the 40-order LSP 416 and the first 24 LSPs out of the 40-order LSP 426. The first 24 are chosen because, in general, the most perceptually discriminating spectral information is located in the lower frequency range.

In the KLD example of FIGS. 4 and 5, data used for training HMMs included 1,024 English and 1,000 Mandarin sentences, respectively. The foregoing closed-form equation (closed form of the equation 444) is used to calculate KLD between every pair of speech sounds, modeled by their respective HMMs. The 16 English vowels and their nearest neighbors measured by KLD from all vowels of English and Mandarin are listed in block 408 of FIG. 4 as set SP 430. The set SP 430 includes six English vowels whose nearest neighbors are Mandarin vowels and there are two-to-one mappings, e.g. both /e / and / / are mapped to / /, among those six vowels.

While the KLD-based technique of FIGS. 4 and 5 was applied to phones, such an approach can be applied to sub-phone and/or complex phones. Additionally, as described further below context can provide for sharing opportunities.

Mandarin is a tonal language of the Sino-Tibetan family, while English is a stress-timed language of the Indo-European family; hence, the analysis results shown in FIGS. 4 and 5 as well as the IPA examination result suggest that English phonemes tend to be different from Mandarin phonemes. However, since the speech production is constrained by limited movement of articulators, as described herein, an exemplary method can find sharing of acoustic attributes at a granular, sub-phone level (see, e.g., the method 600 of FIG. 6).

From another perspective, many complex phonemes can be well rendered by two or three phonemes (e.g. an English diphthong may be similar to a Mandarin vowel pair). An exemplary method can find sharing of sounds by comparing multiple phone groups of one language to sounds in another language, which may be multiple phone groups as well (see, e.g., the method 700 of FIG. 7).

Moreover, as described herein, allophones (e.g., the Initial 'w' /u/ in Mandarin corresponds to [u] in syllable 'wo' and [v] in syllable 'wei') provide more chances for phone sharing between Mandarin and English under certain contexts. Therefore, an exemplary method can use context-dependent HMM state level sharing for a bilingual (Mandarin-English) TTS system (see, e.g., the method 800 of FIG. 8).

Figure 9:
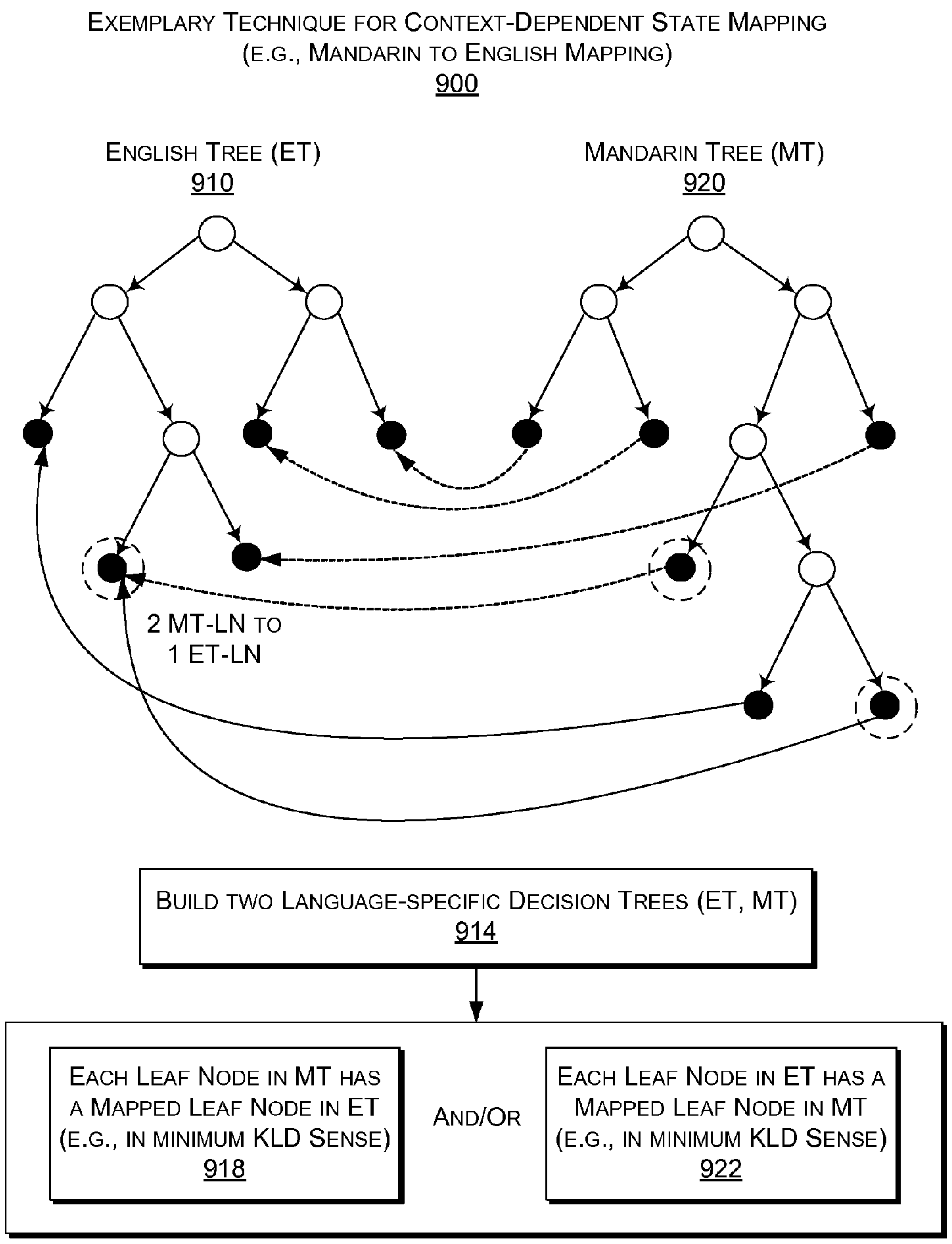
FIG. 9 is a diagram of an exemplary technique for context-dependent state sharing.

Yet another approach described herein includes state level mapping for new language synthesis without recording data (see, e.g., the method 900 of FIG. 9).

Figure 6:
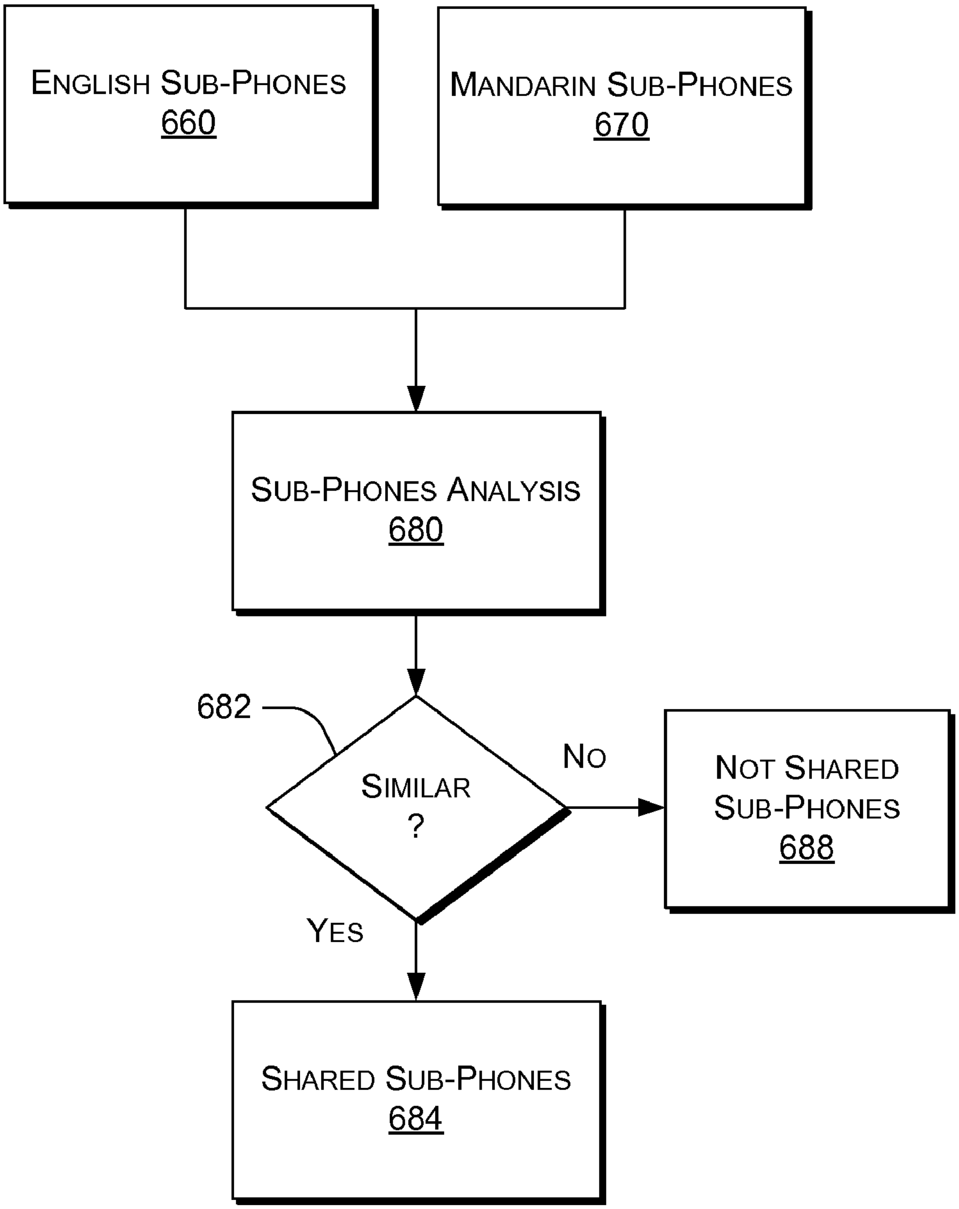
FIG. 6 is a diagram of an exemplary method for determining whether sharing is practical between an English sub-phone and a Mandarin sub-phone.

FIG. 6 shows an exemplary method 600 for finding shared sub-phones. According to the method 600, English sub-phones 660 and Mandarin sub-phones 670 are analyzed by an analysis block 680, for example, using the aforementioned KLD technique for calculating similarity/dissimilarity measures for the sub-phones 660, 670. A decision block 682 uses one or more criteria to decide whether similarity exists. If the decision block 682 decides that similarity exists, then the method 600 classifies the sub-phone sharing in block 684; otherwise, the method 600 classifies the KLD comparison as indicative of non-sharing per block 688.

Figure 7:
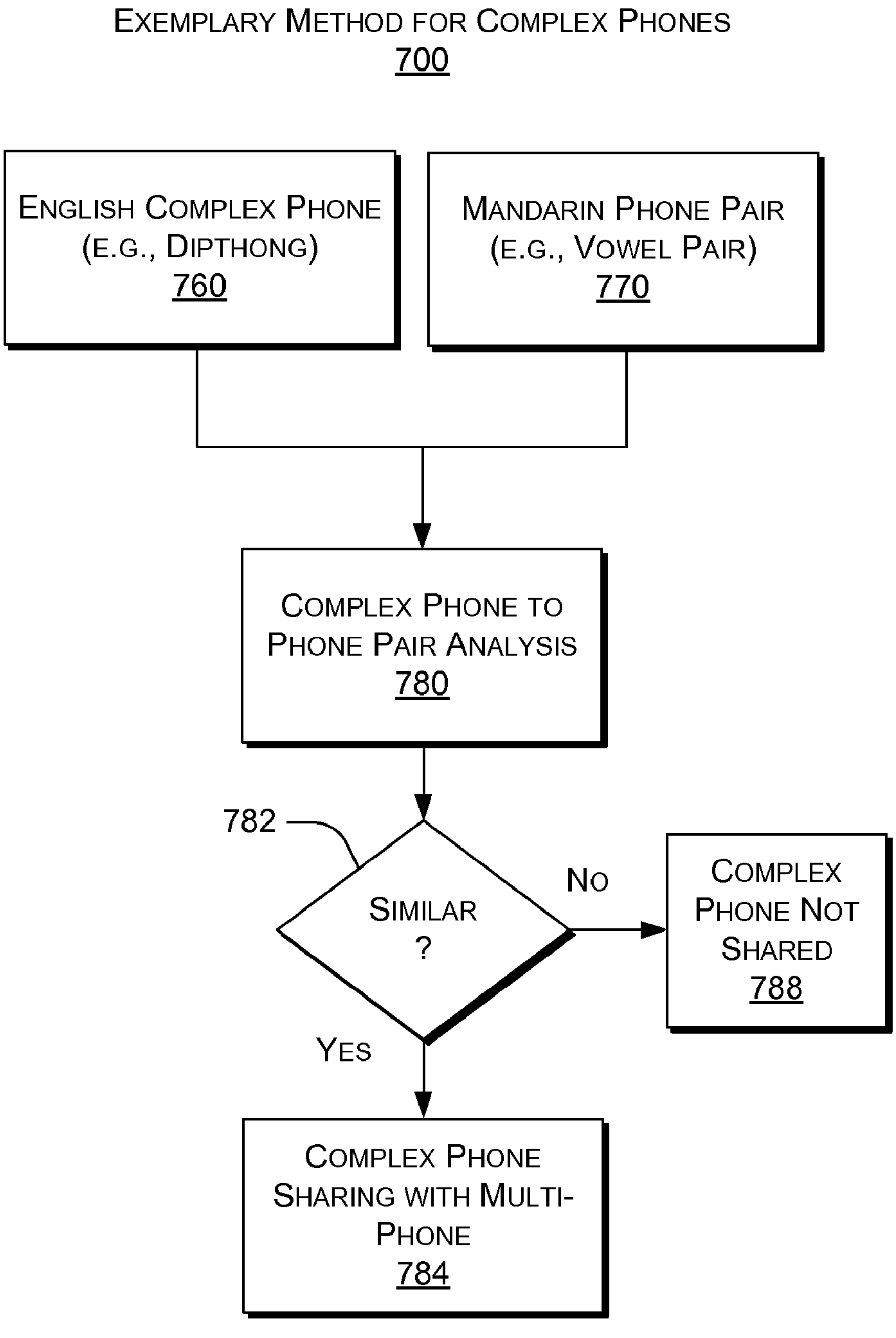
FIG. 7 is a diagram of an exemplary method for determining whether sharing is practical between an English complex phone and a Mandarin phone pair.

FIG. 7 shows an exemplary method 700 for finding shared complex phones. According to the method 700, an English complex phone 760 (e.g., a dipthong) and a Mandarin phone pair 770 (e.g., a vowel pair) are analyzed by an analysis block 780, for example, using the aforementioned KLD technique for calculating similarity/dissimilarity measures for the complex phone and the phone pair 760, 770. A decision block 782 uses one or more criteria to decide whether similarity exists. If the decision block 782 decides that similarity exists, then the method 700 classifies the complex to phone pair sharing in block 784; otherwise, the method 700 classifies the KLD comparison as indicative of non-sharing per block 788.

Figure 8:
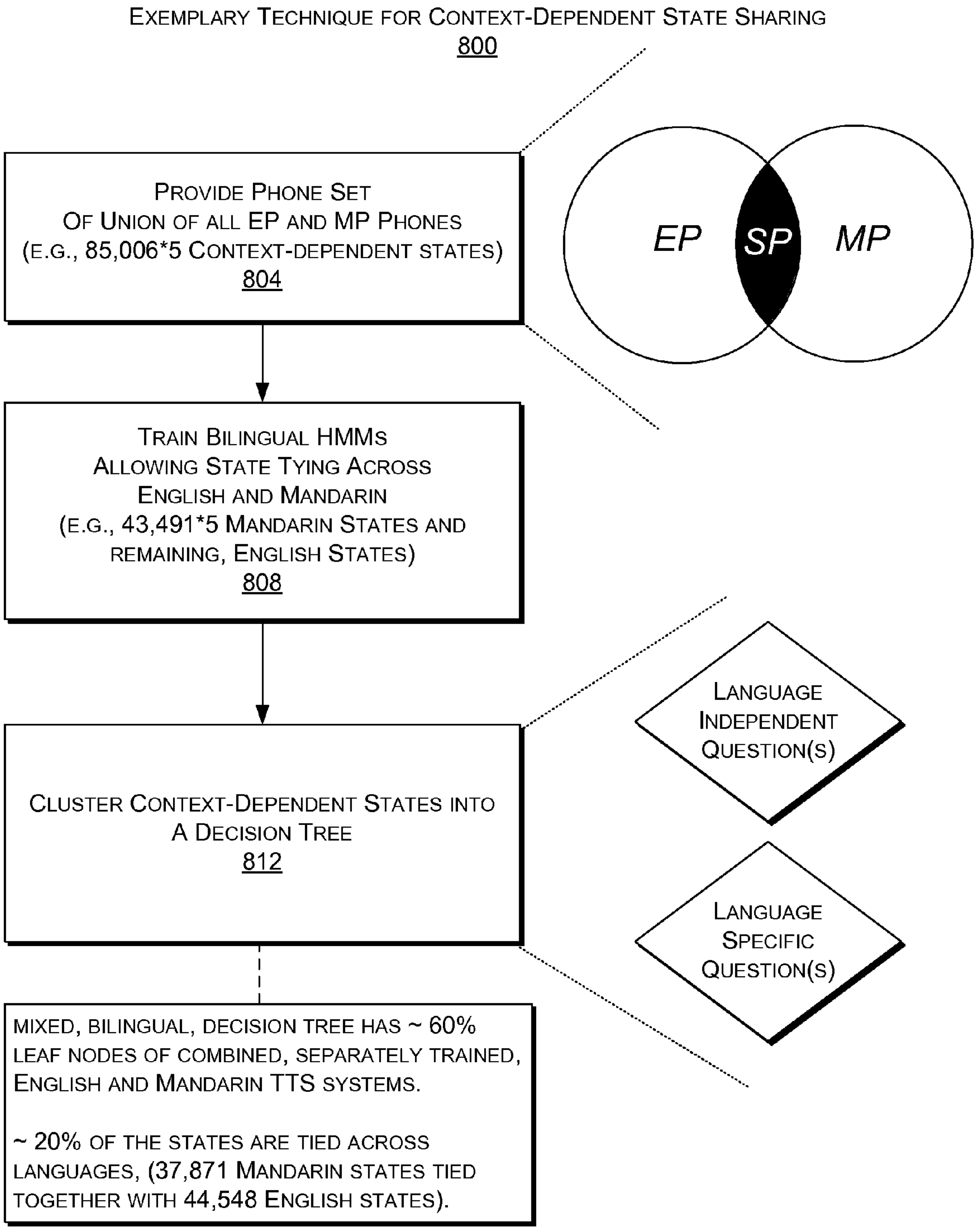
FIG. 8 is a diagram of an exemplary technique for context-dependent state sharing.

FIG. 8 shows an exemplary method for context-dependent state sharing 800. In HMM-based TTS, phone models of rich contexts (e.g., tri-phone, quin-phone models or models with even more and longer contexts like phone positions and POS) are used to capture acoustic co-articulation effects between neighboring phonemes. In practice, however, limited by insufficient training data, tying of models is typically required for providing rich contexts as more generalized ones so as to predict unseen contexts more robustly in testing, for example, state tying via a clustered decision tree has been used.

In the example of FIG. 8, a provision block 804 provides a phone set, which is the union of all the phones in English and Mandarin. In a training block 808, training occurs in a manner where states from different central phones across different languages are allowed to be tied together. The method 800 continues in a clustering block 812 where context-dependent states are clustered in a decision tree. In this example, the clustering uses two questions for growing a decision tree:

i) Language-independent questions: e.g. Velar_Plosive, “Does the state belong to velar plosive phones, which contain / / (Eng.), /k / (Eng.), /k/ (Man.) or /k / (Man.)?”

ii) Language-specific questions: e.g. E_Voiced_Stop, “Does the state belong to English voiced stop phones, which contain /b/, /d/ and / /?”

According to manner and place of articulations, supra-segmental features, etc., questions are constructed so as to tie states of English and Mandarin phone models together.

In the example of FIG. 8, a total of 85,006*5 context-dependent states are generated. Among them, 43,491*5 states are trained from 1,000 Mandarin sentences and the rest from 1,024 English ones. All context-dependent states are then clustered into a decision tree. Such a mixed, bilingual, decision tree has only about 60% of the number of leaf nodes of a system formed by combining two separately trained, English and Mandarin TTS systems. Also, in the example of FIG. 8, about one fifth of the states are tied across languages, i.e. 37,871 Mandarin states are tied together with 44,548 English states.

FIG. 9 shows a diagram and technique for context-dependent state mapping 900. A straightforward technique to build a bilingual, Mandarin and English, TTS system can use pre-recorded Mandarin and English sentences uttered by the same speaker; however, it is not so easy to find professional speakers who are fluent in both languages whenever needed to build an inventory of bilingual voice-fonts of multi-speakers. Also, synthesis of a different target language when only monolingual recording of a source language from a speaker is available is not well-defined. Accordingly, the exemplary technique 900 can be used to first establish a tied, context-dependent state mapping across different languages from a bilingual speaker and then use it as a basis to synthesize other monolingual speakers’ voices in the target language.

According to the technique 900, a build block 914 builds two language-specific decision trees by using bilingual data recorded by one speaker. Per mapping block 918, each leaf node in the Mandarin decision tree (MT) 920 has a mapped leaf node, in the minimum KLD sense, in the English decision tree (ET) 910. Per mapping block 922, each leaf node in the English decision tree (ET) 910 has a mapped leaf node, in the minimum KLD sense, in the Mandarin decision tree (MT) 920. In the tree diagram, tied, context-dependent state mapping (from Mandarin to English) is shown (MT 920 to ET 910). The directional mapping from Mandarin to English can have more than one leaf nodes in the Mandarin tree mapped to one leaf node in the English tree. As shown in the diagram, two nodes in the Mandarin tree 920 are mapped into one node in the English tree 910 (see dashed circles). The mapping from English to Mandarin is similarly done but in a reverse direction, for example, for every English leaf node, the technique finds its nearest neighbor, in the minimum KLD sense, among all leaf nodes in the Mandarin tree. A particular map node-to-node link may be unidirectional or bidirectional.

With respect to speech synthesis, FIG. 10 shows an exemplary technique 1000. According to the technique 1000, in HMM-based speech synthesis, spectral and pitch features are separated into two streams: a spectral feature stream 1010 and a pitch feature stream 1020. Stream-dependent models are built to cluster two features into separated decision trees. In a model block 1022, pitch features are modeled by MSD-HMM, which can model two, discrete and continuous, probability spaces, discrete for unvoiced regions and continuous for voiced F0 contours.

A determination block 1024 determines upper bound of KLD between two MSD-HMMs according to the equation of FIG. 10. In this example, both English and Mandarin have trees of spectrum, pitch and duration and each leaf node of those trees is used to set a mapping between English and Mandarin.

To synthesize speech in a new language without pre-recorded data from the same voice talent, the mapping established with bilingual data and new monolingual data recorded by a different speaker can be used. For example, a context-dependent state mapping trained from speech data of a bilingual (English-Mandarin) speaker “A” can be used to choose the appropriate states trained from speech data of a different, monolingual Mandarin speaker “B” to synthesize English sentences. In this example, the same structure of decision trees should be used for Mandarin training data from speakers A and B.

Figure 11:
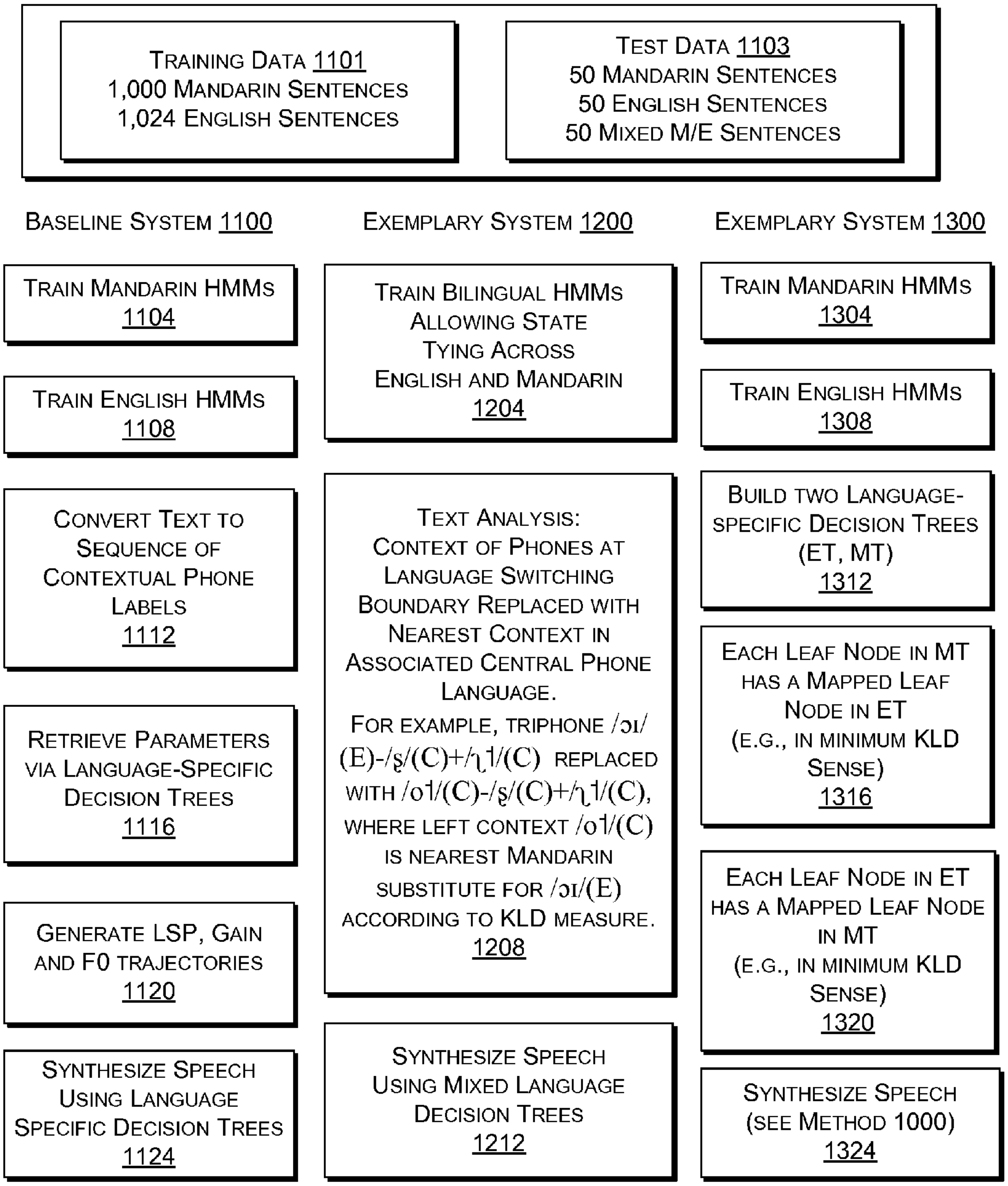
FIG. 11 is a diagram of a baseline system and two exemplary systems for English and Mandarin.

FIG. 11 shows training data 1101 and test data 1103 along with a baseline TTS system 1100, an exemplary state sharing TTS system 1200 and an exemplary mapped TTS system 1300. A broadcast news style speech corpus recorded by a female speaker was used in these trials. The training data 1101 consist of 1,000 Mandarin sentences and 1,024 English sentences, which are both phonetically and prosodically rich. The testing data 1103 consist of 50 Mandarin, 50 English and 50 mixed-language sentences. Speech signals were sampled at 16 kHz, windowed by a 25-ms window with a 5-ms shift, and the LPC spectral features were transformed into 40-order LSPs and their dynamic features. Five-state left-to-right HMMs with single, diagonal Gaussian distributions were adopted for training phone models.

System 1100 is a direct combination of HMMs (Baseline). Specifically, the system 1100 is a baseline system, where language-specific, Mandarin and English HMMs and decision trees are trained separately 1104, 1108. In the synthesis part, input text is converted first into a sequence of contextual phone labels through a bilingual TTS text-analysis frontend 1112 (Microsoft® Mulan software marketed by Microsoft Corporation, Redmond, Wash.). The corresponding parameters of contextual states in HMMs are retrieved via language-specific decision trees 1116. Then LSP, gain and F0 trajectories are generated in the maximum likelihood sense 1120. Finally, speech waveforms are synthesized from the generated parameter trajectories 1124. In synthesizing a mixed-language sentence, depending upon the text segments to be synthesized is Mandarin or English, appropriate language-specific HMMs are chosen to synthesize corresponding parts of the sentence.

System 1200 includes state sharing across languages. In the system 1200, both 1,000 Mandarin sentences and 1,024 English sentences were used together for training HMMs 1204 and context-dependent state sharing across languages as discussed above was applied. Per a text analysis block 1208, since there are no mixed-language sentences in the training data, the context of phones at a language switching boundary (e.g. the left phone or the right phone), is replaced with the nearest context in the language which the central phone belongs to in the text analysis module. For example, the triphone / /(E)–/ /(C)+/ /(C)/ will be replaced /(C) /o /(C)–/ /(C)+/ /(C), where the left /o□/(C) /o /(C) is the nearest Mandarin ute for /□/(E) / /(E) according to the KLD measure. In a synthesis block 1212, decision trees of mixed-languages are used instead of the language-specific ones as in block 1124 of the system 1100.

System 1300 includes state mapping across languages. In this system, training of Mandarin HMMs 1304 and English HMMs 1308 occurs followed by building two language-specific decision trees 1312 (see, e.g., ET 910 and MT 920 of FIG. 9). Mapping per map blocks 1316 and 1320 provided for mapping, as explained with respect to the technique 900 of FIG. 9. Per synthesis block 1324, a trial was performed to synthesize sentences of a language without pre-recorded data. To evaluate the upper bound quality of synthesized utterances in the target language, the trial used the same speaker's voice when extracting state mapping rules and synthesizing the target language.

FIG. 12 shows various tables and plots for characterizing the trials discussed with respect to FIG. 11. Table 1405 shows a comparison of the number of tied states or leaf nodes in decision trees of LSP, log F0 and duration, and corresponding average log probabilities of the system 1100 and the system 1200 in training. In table 1405, it is observed that the total number of tied states (HMM parameters) of the system 1200 is about 40% less, when compared with those of the system 1100. The log probability per frame obtained in training the system 1200 is almost the same as that of the system 1100.

Synthesis quality is measured objectively in terms of distortions between original speech and speech synthesized by the system 1100 and the system 1200. Since the predicted HMM state durations of generated utterances are in general not the same as those of original speech, the trials measured the root mean squared error (RMSE) of phone durations of synthesized speech. Spectra and pitch distortions were then measured between original speech and synthesized speech where the state durations of the original speech (obtained by forced alignment) were used for speech generation. In this way, both spectrum and pitch are compared on a frame-synchronous basis between the original and synthesized utterances.

Table 1410 shows the averaged log spectrum distance, RMSE of F0 and phone durations evaluated in 100 test sentences (50 Mandarin and 50 English) generated by the system 1100 and the system 1200. The data indicate that the distortion difference between the system 1100 and the system 1200 in terms of log spectrum distance, RMSEs of F0 and duration are negligibly small.

The plot 1420 provides results of a subjective evaluation. Informal listening to the monolingual sentences synthesized by the system 1100 and the system 1200 confirms the objective measures shown in the table 1410: i.e. there is hardly any difference, subjective or objective, in 100 sentences (50 Mandarin, 50 English) synthesized by the systems 1100 and 1200.

Specifically, the results of the plot 1420 are from the 50 mixed-language sentences generated by the two systems 1100 and 1200 as evaluated subjectively in an AB preference test by nine subjects. The preference score of the system 1200 (60.2%) is significantly higher than that of the system 1100 (39.8%) ($\alpha$=0.001, CI=[0.1085, 0.3004]). The main perceptually noticeable difference in the paired sentences synthesized by the systems 1100 and 1200 is at the transitions between English and Chinese words in the mixed-language sentences. State sharing through tied states across Mandarin and English in the system 1200 helps to alleviate the problem of segmental and supra-segmental discontinuities between Mandarin and English transitions. Since all training sentences are either exclusively Chinese or English, there is no specific training data to train such language-switching phenomena. As a result, the system 1100, without any state sharing across English and Mandarin, is more prone to the synthesis artifacts at the switches of English and Chinese words.

Overall, results from the trials indicate that system 1200, which is obtained via efficient state tying across different languages and with a significantly smaller HMM model size than the system 1100, can produce the same synthesis quality for non-mixed language sentences and better synthesis quality for mixed-language ones.

With respect to the system 1300, fifty Mandarin test sentences were synthesized by English HMMs. Five subjects were asked to transcribe the 50 synthesized sentences to evaluate their intelligibility. A Chinese character accuracy of 93.9% is obtained.

An example of F0 trajectories predicted by the system 1100 (dotted line) and the system 1300 (solid line) are shown in plot 1430 of FIG. 12. As shown in the plot 1430, possibly due to the MSD modeling of voice/unvoiced stochastic phenomena and KLD measure used for state mapping, the voice/unvoiced boundaries are well aligned between the two trajectories generated by the system 1100 and the system 1300. Furthermore, the rising and falling trend of F0 contours in those two trajectories is also well-matched. However, F0 variation predicted by the system 1300 is smaller than that by the system 1100. After analyzing the English and Mandarin training sentences, it was found that the variance of F0 in Mandarin sentences is much larger than that in English ones. Both means and variances of the two databases are shown in table 1440. The much larger variance of Mandarin sentences is partially due to the lexical tone nature of Mandarin where the variation in four (or five) lexical tones increases the intrinsic variance or the dynamic range of F0 in Mandarin.

As described herein, various exemplary techniques are used to build exemplary HMM-based bilingual (Mandarin-English) TTS systems. The trial results show that the exemplary TTS system 1200 with context-dependent HMM state sharing across languages outperforms the simple baseline system 1100 where two language-dependent HMMs are used together. In addition, state mapping across languages based upon the Kullback-Leibler divergence can be used to synthesize Mandarin speech using model parameters in an English decision tree and the trial results show that the synthesized Mandarin speech is highly intelligible.

Figure 13:
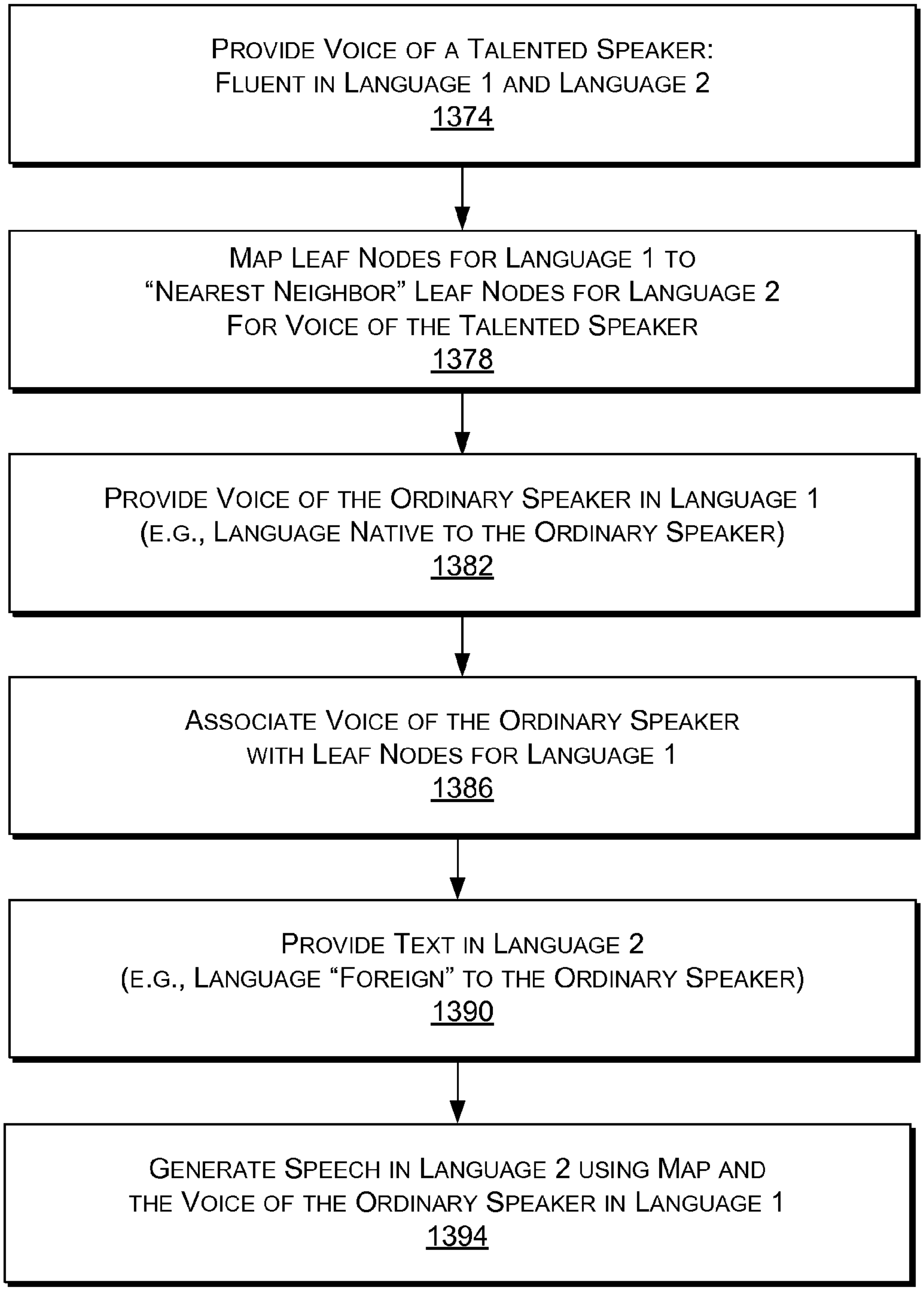
FIG. 13 is a diagram of an exemplary technique to extend speech of an ordinary speaker to a "foreign" language.

FIG. 13 is an exemplary technique 1370 for extending speech of an ordinary speaker to a "foreign" language. This particular example can be implemented using the technique 900 of FIG. 9 where mapping occurs between a decision tree for one language and a decision tree for another language, noting that for two languages, mapping may be unidirectional or bidirectional. For systems with more than two languages, a variety of mapping possibilities exist (e.g., language 1 to 2 and 3, language 2 to language 1, language 3 to language 2, etc.).

According to the technique 1370, a provision block 1374 provides the voice of a talented speaker that is fluent in language 1 and language 2 where language 1 is understood (e.g., native) by the ordinary speaker and where language 2 is not fully understood (e.g., foreign) by the ordinary speaker. A map block 1378 maps leaf nodes for language 1 to "nearest neighbor" leaf nodes for language 2 for the voice of the talented speaker. As the talented speaker can provide "native"

sounds in both languages, the mapping can more accurately map similarities between sounds used in language 1 and sounds used in language 2.

The technique 1370 continues in provision block 1382 where the voice of the ordinary speaker in language 1 is provided. An association block 1386 associates the provided voice sounds of the ordinary speaker with the appropriate leaf nodes for language 1. As a map already exists, as established using the talented speaker's voice, between language 1 sounds and language 2 sounds, an exemplary system can now generate at least some language 2 speech using the ordinary speaker's sounds from language 1.

For purposes of TTS, a provision block 1390 provides text in language 2, which is, for example, the language "foreign" to the ordinary speaker, and a generation block 1394 generates speech in language 2 using the map and the voice (e.g., speech sounds) of the ordinary speaker in language 1. Thus, the technique 1370 extends the speech abilities of the ordinary speaker to language 2.

In the example of FIG. 13, the ordinary speaker may be completely naïve in language 2 or the ordinary speaker may have some degree of skill in language 2. Depending on the skill, a speaker may supplement the technique 1370 by providing speech in language 2, as well as language 1. Various possibilities exist for mapping and sound choice where the speaker supplements by providing speech in language 1 and language 2.

In the example of FIG. 13, once the speaker becomes fluent in language 2, then the speaker may be considered a talented speaker and train an exemplary TTS system per blocks 1374 and 1378, as described with respect to technique 900 of FIG. 9.

Figure 14:
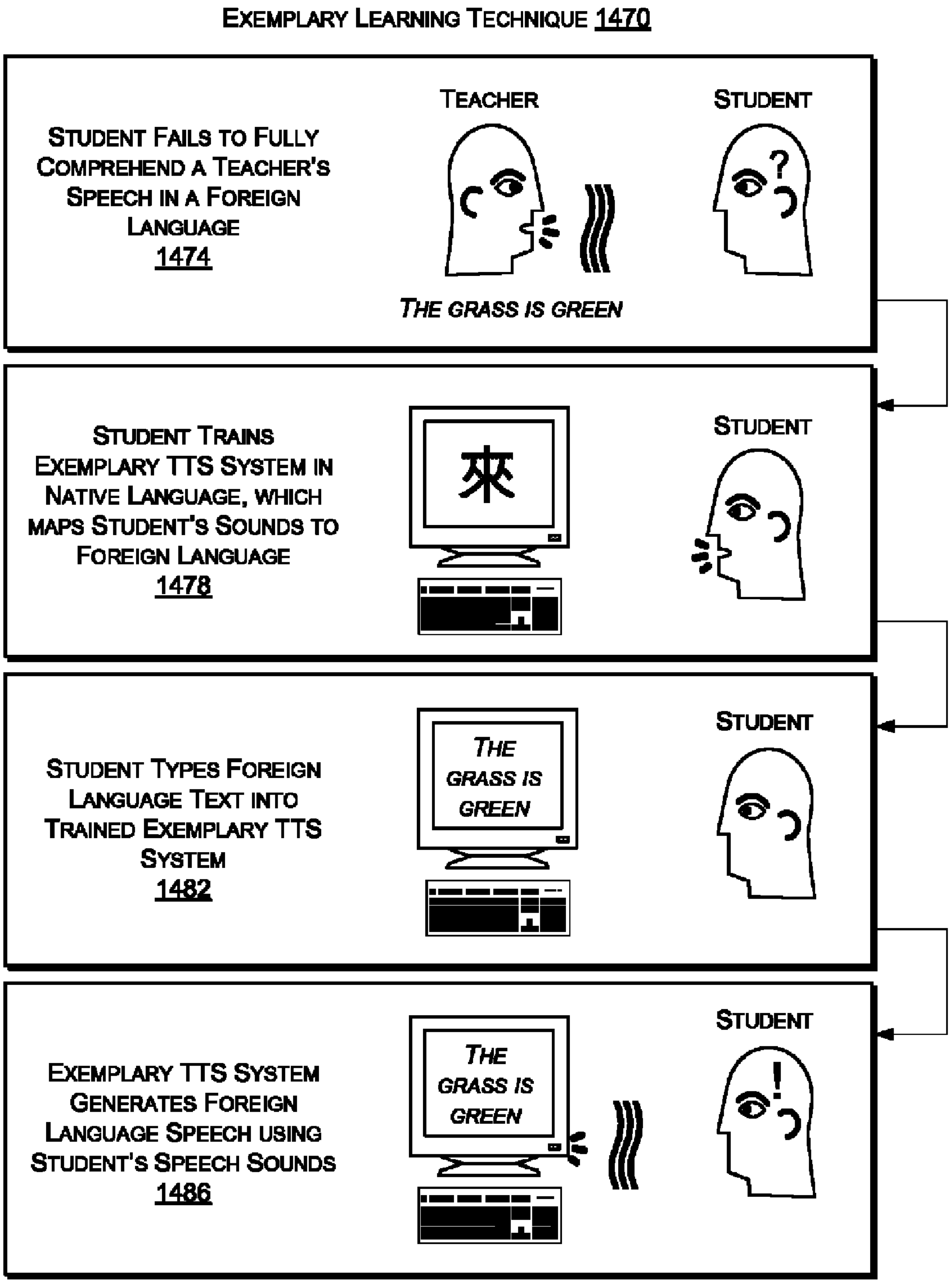
FIG. 14 is a diagram of an exemplary technique for learning a language.

FIG. 14 shows an exemplary learning technique 1470 to assist a student in learning a language. Per block 1474, a student fails to fully comprehend a teacher's speech in a foreign language. For example, the student may be a native speaker of Mandarin and the teacher may be a teacher of English; thus, English is the foreign language.

In block 1478, the student trains an exemplary TTS system in the student's native language where the TTS system maps the student's speech sounds to the foreign language. To more fully comprehend the speech of the teacher and hence the foreign language, per block 1482, the student enters text for the uttered phrase (e.g., "the grass is green"). In a generation block 1486, the TTS system generates the foreign language speech using the student's speech sounds, which are more familiar to the student's ear. Consequently, the student more readily comprehends the teacher's utterance. Further, the TTS system may display or otherwise output a listing of sounds (e.g., phonetically or as words, etc.) such that the student can more readily pronounce the phrase of interest (i.e., per the entered text of block 1482). The technique 1470 can provide a student with feedback in a manner that can enhance learning of a language.

In the exemplary techniques 1370 and 1470, sounds may be phones, sub-phones, etc. As already explained, at the sub-phone level mapping may occur more readily or accurately, depending on the similarity criterion (or criteria) used. An exemplary technique may use a combination of sounds. For example, phones, sub-phones, complex phones, phone pairs, etc., may be used to increase mapping and more broadly cover the range of sounds for a language or languages.

An exemplary method for generating speech based on text in one or more languages, implemented at least in part by a computer, includes providing a phone set for two or more languages, training multilingual HMMs where the HMMs includes state level sharing across languages, receiving text in one or more of the languages of the multilingual HMMs and generating speech, for the received text, based at least in part on the multilingual HMMs. Such a method optionally includes context-dependent states. Such a method optionally includes clustering states into a decision tree, for example, where the clustering may use of a language independent question and/or a language specific question.

An exemplary method for generating speech based on text in one or more languages, implemented at least in part by a computer, includes building a first language specific decision tree, building a second language specific decision tree, mapping a leaf node form the first tree to a leaf node of the second tree, mapping a leaf node from the second tree to a leaf node of the first tree, receiving text in one or more of the languages of the first language and the second language and generating speech, for the received text, based at least in part on the mapping a leaf node form the first tree to a leaf node of the second tree and/or the mapping a leaf node from the second tree to a leaf node of the first tree. Such a method optionally uses a KLD technique for mapping. Such a method optionally includes multiple leaf nodes of one decision tree that map to a single leaf node of another decision tree. Such a method optionally generates speech occurs without using recording data. Such a method may use unidirectional mapping where, for example, mapping only exists from language 1 to language 2 or only exists from language 2 to language 1.

An exemplary method for reducing memory size of a multilingual TTS system, implemented at least in part by a computer, includes providing a HMM for a sound in a first language, providing a HMM for a sound in a second language, determining line spectral pairs for the sound in the first language, determining line spectral pairs for the sound in the second language, calculating a KLD score based on the line spectral pairs for the for the sound in the first language and the sound in the second language where the KLD score indicates similarity/dissimilarity between the sound in the first language and the sound in the second language and building a multilingual HMM-based TTS system where the TTS system comprises shared sounds based on KLD scores. In such a method, the sound in the first language may be a phone, a sub-phone, a complex phone, a phone multiple, etc., and the sound in the second language may be a phone, a sub-phone, a complex phone, a phone multiple, etc. In such a method, a sound may be a context-dependent sound.

Exemplary Computing Device

Figure 15:
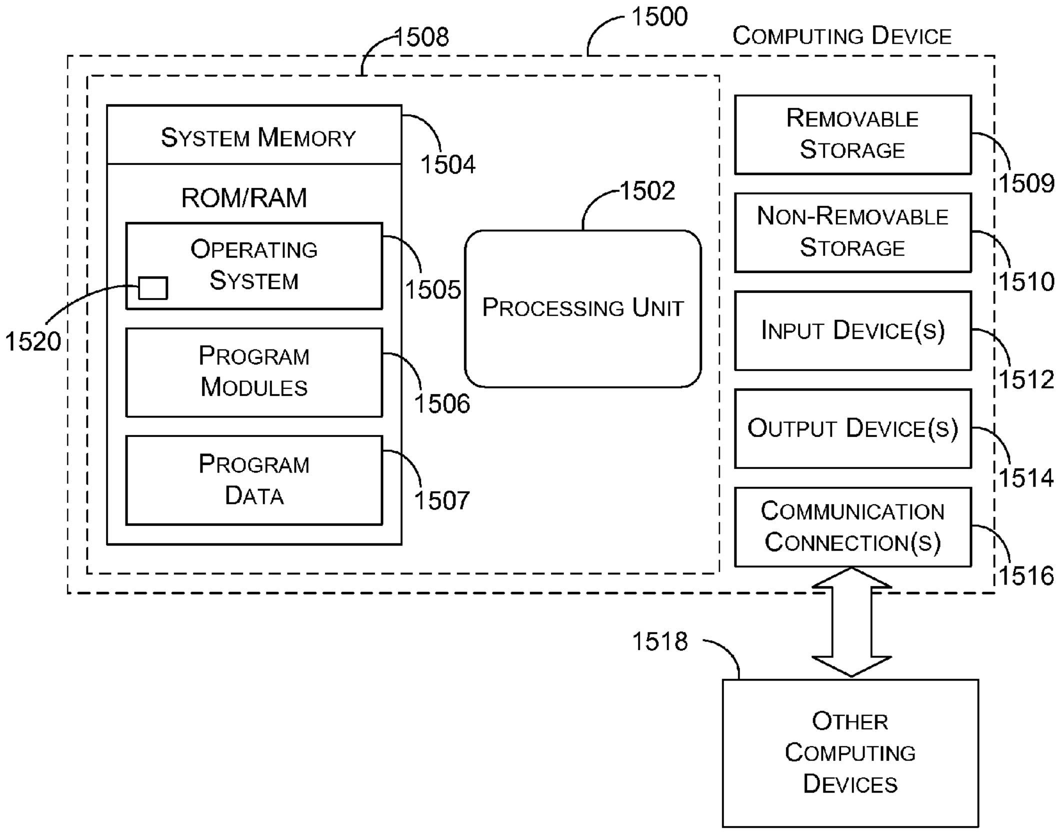
FIG. 15 is a diagram of various components of an exemplary computing device that may be used to implement part or all of various exemplary methods discussed herein.

FIG. 15 shows various components of an exemplary computing device 1500 that may be used to implement part or all of various exemplary methods discussed herein.

The computing device shown in FIG. 15 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 15, an exemplary system for implementing an exemplary character generation system that uses a features-based approach to conditioning ink data includes a computing device, such as computing device 1500. In a very basic configuration, computing device 1500 typically includes at least one processing unit 1502 and system memory 1504. Depending on the exact configuration and type of computing device, system memory 1504 may be volatile (such as RAM), non-volatile (such as ROM, flash memory, etc.) or some combination of the two. System memory 1504 typically includes an operating system 1505, one or more program modules 1506, and may include program data 1507. This basic configuration is illustrated in FIG. 15 by those components within dashed line 1508.

The operating system 1505 may include a component-based framework 1520 that supports components (including properties and events), objects, inheritance, polymorphism, reflection, and provides an object-oriented component-based application programming interface (API), such as that of the .NET™ Framework manufactured by Microsoft Corporation, Redmond, Wash.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 15 by removable storage 1509 and non-removable storage 1510. Computer storage media may include volatile and nonvolatile, removable and non-removable media implemented in any method or technology for storage of information, such as computer readable instructions, data structures, program modules, or other data. System memory 1504, removable storage 1509 and non-removable storage 1510 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1500. Any such computer storage media may be part of device 1500. Computing device 1500 may also have input device(s) 1512 such as keyboard, mouse, pen, voice input device, touch input device, etc. Output device(s) 1514 such as a display, speakers, printer, etc. may also be included. These devices are well know in the art and need not be discussed at length here.

Computing device 1500 may also contain communication connections 1516 that allow the device to communicate with other computing devices 1518, such as over a network. Communication connection(s) 1516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

An exemplary computing device may include a processor, a user input mechanism (e.g., a mouse, a stylus, a scroll pad, etc.), a speaker, a display and control logic implemented at least in part by the processor to implement one or more of the various exemplary methods described herein for TTS. For TTS, such a device may be a cellular telephone or generally a handheld computer.

One skilled in the relevant art may recognize, however, that the techniques described herein may be practiced without one or more of the specific details, or with other methods, resources, materials, etc. In other instances, well known structures, resources, or operations have not been shown or described in detail merely to avoid obscuring aspects of various exemplary techniques.

While various examples and applications have been illustrated and described, it is to be understood that the techniques are not limited to the precise configuration and resources described above. Various modifications, changes, and variations apparent to those skilled in the art may be made in the arrangement, operation, and details of the methods, systems, etc., disclosed herein without departing from their practical scope.

What is claimed is:

1. A method for generating speech based on text in one or more languages, implemented at least in part by a computer, the method comprising:

providing a phone set for a plurality of languages, the phone set comprising a union of phones of the plurality of languages;

training, for the plurality of languages, a multilingual hidden Markov model (HMM) comprising state level sharing across the plurality of languages based on language sentences in each of the plurality of languages without any sentences including a mixture of more than one language;

tying states of the multilingual HMM across the plurality of languages and clustering the tied states across the plurality of languages into a single decision based at least in part on a language independent question and a language specific question;

receiving text in one or more of the plurality of languages of the multilingual HMM; and generating speech, for the received text, based at least in part on the multilingual HMM.

2. The method of claim 1 wherein the plurality of languages comprise English and/or Mandarin.

3. The method of claim 1, wherein the tied states comprise context-dependent states.

4. A method for generating speech based on text, implemented at least in part by a computer, the method comprising:

building a first language specific decision tree;

building a second language specific decision tree;

mapping a leaf node from the first tree to a leaf node of the second tree using a Kullback-Leibler divergence (KLD) technique based on a spectral feature located in a subset of less than all of a frequency range for measuring the KLD between two hidden Markov models (HMMs);

receiving text in the second language; and generating speech in the second language, for the received text, based at least in part on the mapping the leaf node from the first tree to the leaf node of the second tree.

5. The method of claim 4 further comprising mapping a leaf node from the second tree to a leaf node of the first tree.

6. The method of claim 4 wherein multiple leaf nodes of one decision tree map to a single leaf node of another decision tree.

7. The method of claim 4 wherein the first language comprises Mandarin.

8. The method of claim 4 wherein the first and the second language comprise English and Mandarin.

9. The method of claim 4 wherein the generating speech occurs without using speech provided in the second language.

10. A method for a multilingual text-to-speech (TTS) system, implemented at least in part by a computer, the method comprising:

providing a hidden Markov model (HMM) for a sound in a first language;

providing a HMM for a sound in a second language;

determining line spectral pairs for the sound in the first language;

determining line spectral pairs for the sound in the second language;

calculating a Kullback-Leibler divergence (KLD) score based at least on the line spectral pairs for the sound in the first language and the sound in the second language, wherein the KLD score indicates similarity/dissimilarity between the sound in the first language and the sound in the second language based on line spectral pairs that are independent of at least a line spectral pair located in an upper half of a frequency range used for measuring a Kullback-Leibler divergence; and building a multilingual HMM-based TTS system wherein the TTS system comprises shared sounds based on KLD scores.

11. The method of claim 10 wherein the sound in the first language comprises a phone and wherein the sound in the second language comprises a phone.

12. The method of claim 10 wherein the sound in the first language comprises a sub-phone and wherein the sound in the second language comprises a sub-phone.

13. The method of claim 10 wherein the sound in the first language comprises a complex phone and wherein the sound in the second language comprises two or more phones.

14. The method of claim 10 wherein the sound in the first language comprises a context-dependent sound.

* * * * *